United States Patent
Katano

(10) Patent No.: US 9,742,015 B2
(45) Date of Patent: Aug. 22, 2017

(54) FUEL GAS FEEDING DEVICE AND CONTROL METHOD THEREFOR

(75) Inventor: Koji Katano, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 1711 days.

(21) Appl. No.: 11/993,481

(22) PCT Filed: Aug. 10, 2006

(86) PCT No.: PCT/JP2006/316135
§ 371 (c)(1),
(2), (4) Date: Dec. 21, 2007

(87) PCT Pub. No.: WO2007/020957
PCT Pub. Date: Feb. 22, 2007

(65) Prior Publication Data
US 2009/0053567 A1    Feb. 26, 2009

(30) Foreign Application Priority Data
Aug. 12, 2005  (JP) ................................ 2005-234186

(51) Int. Cl.
*H01M 8/04*     (2016.01)
*H01M 8/04082*  (2016.01)
(Continued)

(52) U.S. Cl.
CPC ... *H01M 8/04201* (2013.01); *H01M 8/04089* (2013.01); *H01M 8/04388* (2013.01);
(Continued)

(58) Field of Classification Search
CPC ............................ H01M 8/04; H01M 8/04082
(Continued)

(56) References Cited

U.S. PATENT DOCUMENTS 4,974,565 A * 12/1990 Hashimoto et al. .......... 239/464
6,374,166 B1 * 4/2002 Takeda .................. B60L 3/0023
180/65.1
(Continued)

FOREIGN PATENT DOCUMENTS

JP          11 154528      6/1999
JP         2002-222658    8/2002
(Continued)

OTHER PUBLICATIONS

Office Action issued Nov. 15, 2011, in Japanese Patent Application No. 2005-234186, filed Aug. 12, 2005.

*Primary Examiner* — Jacob Marks
(74) *Attorney, Agent, or Firm* — Oblon, McClelland, Maier & Neustadt, L.L.P.

(57) ABSTRACT

To provide a technique to suppress an excessive rise of pressure between two pressure reducing valves if the amount of fuel gas consumed by a fuel cell stack decreases. A fuel gas supply apparatus comprises: a gas passage in which fuel gas to be supplied to a fuel cell stack flows; a first pressure reducing valve provided to the gas passage; a second pressure reducing valve provided to the gas passage and disposed at a downstream side of the first pressure reducing valve; a setting module that sets a value of target pressure at a downstream side of the second pressure reducing valve, to a value depending on a consumed amount of fuel gas consumed by the fuel cell stack; and a modifying module that, if the consumed amount decreases by a prescribed amount or more, modifies the value of target pressure of the second pressure reducing valve to a value greater than a corresponding value that corresponds to the consumed amount subsequent to the decrease.

9 Claims, 13 Drawing Sheets

(51) Int. Cl.
  *H01M 8/04089* (2016.01)
  *H01M 8/0438* (2016.01)
  *H01M 8/04537* (2016.01)
  *H01M 8/04791* (2016.01)

(52) U.S. Cl.
  CPC ... *H01M 8/04589* (2013.01); *H01M 8/04798* (2013.01); *H01M 8/04197* (2016.02); *H01M 2250/20* (2013.01); *Y02T 90/32* (2013.01)

(58) Field of Classification Search
  USPC ........................................................ 429/428
  See application file for complete search history.

(56) References Cited

U.S. PATENT DOCUMENTS

| | | | |
|---|---|---|---|
| 6,938,840 B1 * | 9/2005 | Trutschel et al. | 239/533.12 |
| 2004/0241511 A1 | 12/2004 | Kamihara et al. | |
| 2007/0243434 A1 * | 10/2007 | Jahnke et al. | 429/22 |
| 2008/0220303 A1 * | 9/2008 | Yoshida | H01M 8/04097 429/423 |

FOREIGN PATENT DOCUMENTS

| | | | | |
|---|---|---|---|---|
| JP | 2002 231278 | | 8/2002 | |
| JP | 2004095425 | * | 3/2004 | ............. H01M 8/04 |
| JP | 2004 127748 | | 4/2004 | |
| JP | 2005 108648 | | 4/2005 | |
| JP | 2005 123076 | | 5/2005 | |
| JP | 2005 123093 | | 5/2005 | |
| JP | 2005 216519 | | 8/2005 | |
| WO | WO2005088755 | * | 9/2005 | ............. H01M 8/04 |

* cited by examiner

Fig.4(a) OUTPUT CURRENT OF FUEL CELL STACK
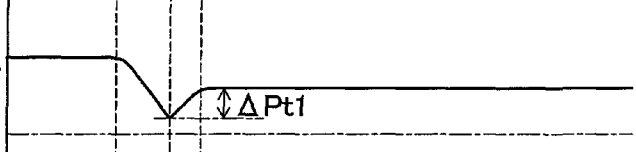
Fig.4(b) TARGET PRESSURE OF SECOND PRESSURE REDUCING VALVE (Pt)
Fig.4(c) DEGREE OF OPENING OF SECOND PRESSURE REDUCING VALVE
Fig.4(d) DEGREE OF OPENING OF FIRST PRESSURE REDUCING VALVE
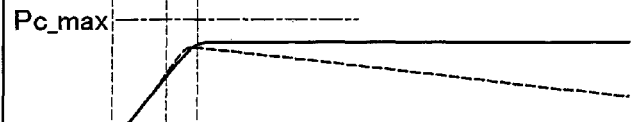
Fig.4(e) PRESSURE IN THIRD PARTIAL PASSAGE (Pc)
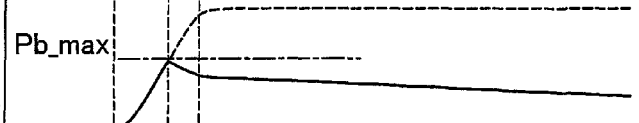
Fig.4(f) PRESSURE IN SECOND PARTIAL PASSAGE (Pb)

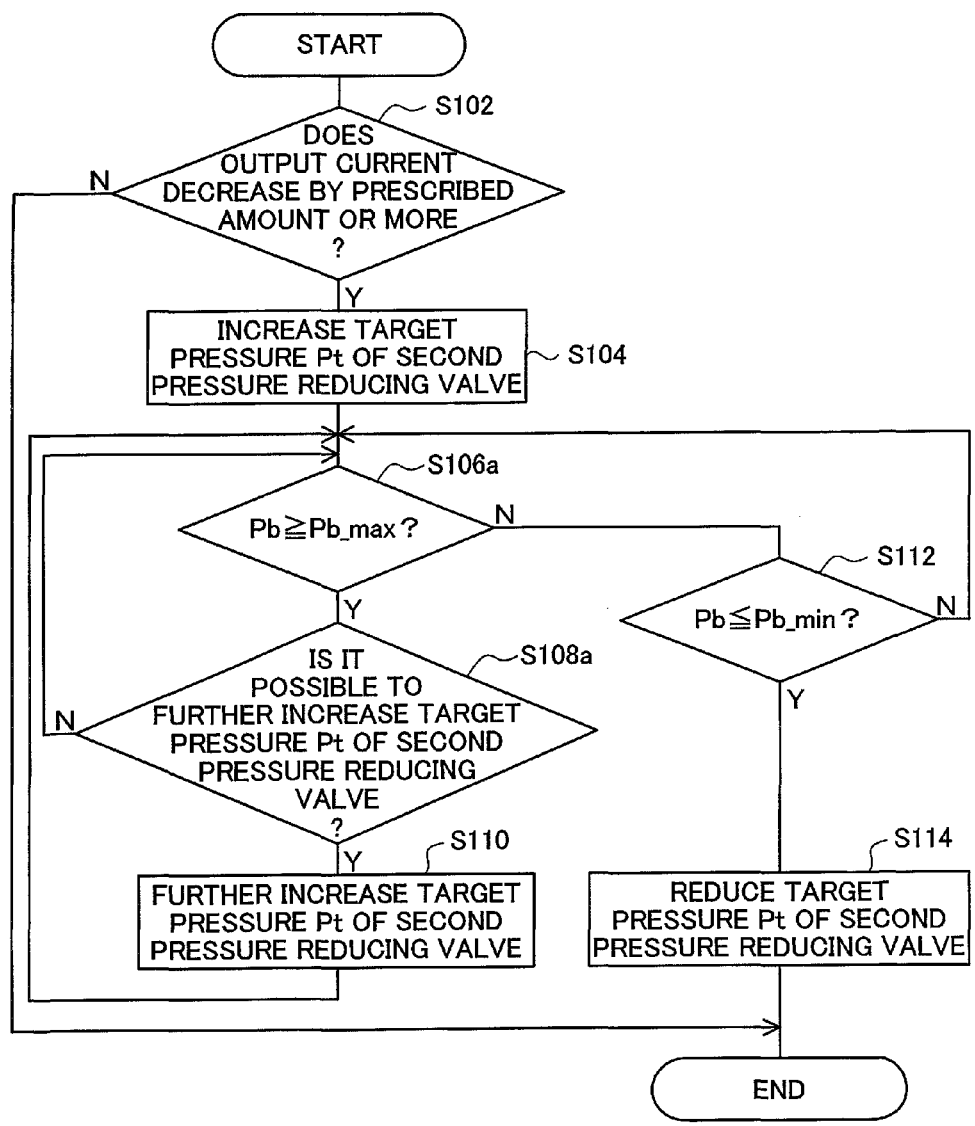

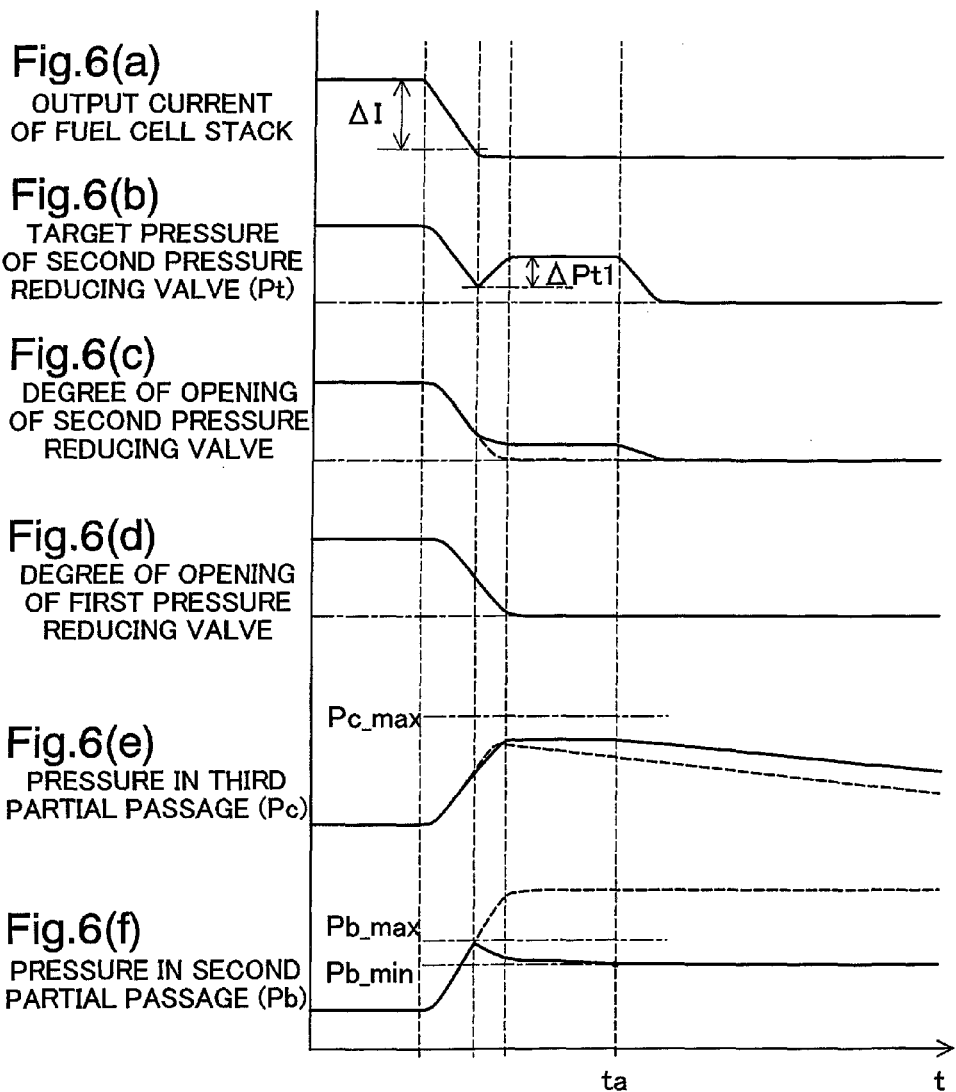

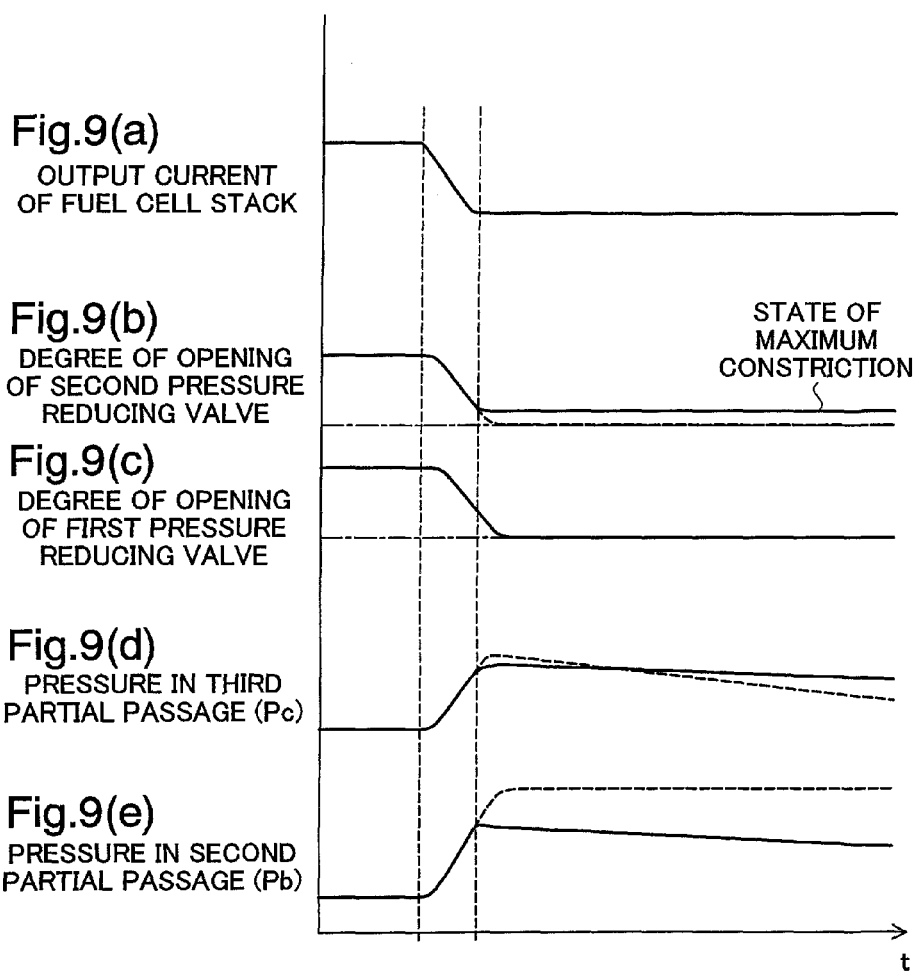

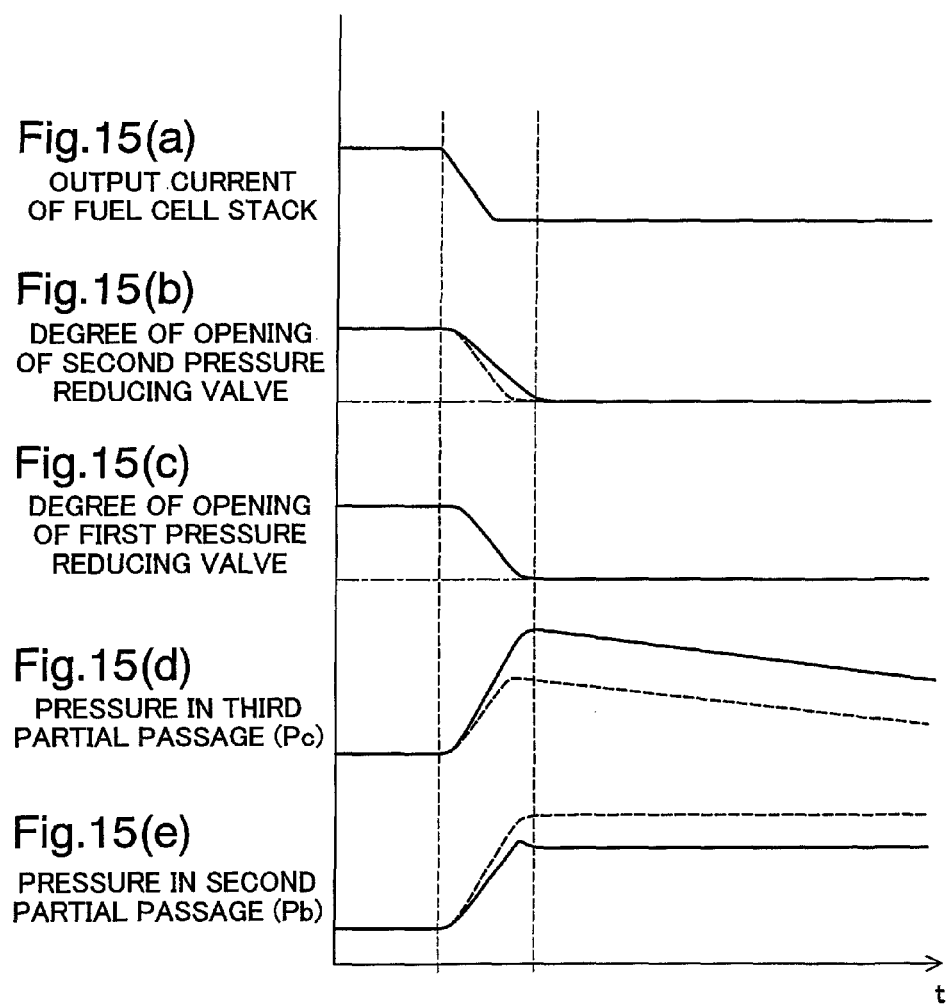

FUEL GAS FEEDING DEVICE AND CONTROL METHOD THEREFOR

TECHNICAL FIELD

The present invention relates to a fuel cell system, and in particular relates to a fuel gas supply apparatus for supplying fuel gas to a fuel cell.

BACKGROUND ART

A fuel cell system includes a fuel cell stack, a fuel gas supply system for supplying a fuel gas to the fuel cell stack, and an oxidant gas supply system for supplying an oxidant gas to the fuel cell stack. The fuel gas supply system includes, for example, a tank for storing the fuel gas under high pressure, and a fuel gas passage connecting the tank with the fuel cell stack. The fuel gas supply system typically includes a first pressure reducing valve disposed on the upstream side of the fuel gas passage and a second pressure reducing valve disposed on the downstream side of the fuel gas passage. Each of the pressure reducing valves has the function of adjusting the pressure at the downstream side thereof to a target pressure.

Now, in the event of a sudden decrease of the amount of fuel gas consumed by the fuel cell stack, typically, the second pressure reducing valve on the downstream side closes first, and the first pressure reducing valve disposed on the upstream side closes thereafter. Specifically, once the amount of fuel gas consumed by the fuel cell stack decreases suddenly, pressure rises on the downstream side of the second pressure reducing valve, and as a result the second pressure reducing valve closes. Once the second pressure reducing valve begins to close, pressure rises on the downstream side of the first pressure reducing valve, and as a result the first pressure reducing valve closes. Where as described above, the second pressure reducing valve is set to the closed state first and the first pressure reducing valve is set to the closed state thereafter, pressure rises excessively between the two pressure reducing valves. Thus, in the background art, there is a risk of damage to the two pressure reducing valves and to the passage between the two pressure reducing valves, and it is necessary to improve pressure resistance of these portions.

DISCLOSURE OF THE INVENTION

The object of the present invention is thus to solve the drawbacks of the background art discussed above, and to suppress an excessive rise of pressure between two pressure reducing valves if the amount of fuel gas consumed by a fuel cell decreases.

At least part of the above and the other related objects is attained by a first apparatus of the present invention, which is a fuel gas supply apparatus for supplying fuel gas to a fuel cell. The fuel gas supply apparatus comprises: a gas passage in which fuel gas to be supplied to the fuel cell flows; a first pressure reducing valve provided to the gas passage; a second pressure reducing valve provided to the gas passage and disposed at a downstream side of the first pressure reducing valve; a setting module that sets a value of target pressure at a downstream side of the second pressure reducing valve, to a value depending on a consumed amount of fuel gas consumed by the fuel cell; and a modifying module that, if an amount of fuel gas consumed by the fuel cell decreases by a prescribed amount or more, modifies the value of target pressure of the second pressure reducing valve to a value greater than a corresponding value that is set by the setting module and corresponds to the consumed amount of fuel gas consumed by the fuel cell subsequent to the decrease.

With this apparatus, if the consumed amount of fuel gas decreases by the prescribed amount or more, the value of target pressure of the second pressure reducing valve is set to the value greater than the corresponding value that corresponds to the consumed amount subsequent to the decrease, and thus the second pressure reducing valve is set to a significant degree of opening. As a result, the fuel gas between the two pressure reducing valves flows out via the second pressure reducing valve to the fuel cell on the downstream side, and thus an excessive rise of pressure between two pressure reducing valves can be suppressed.

In the above apparatus, it is preferable that the fuel gas supply apparatus further comprises: a pressure sensor for sensing pressure between the first pressure reducing valve and the second pressure reducing valve. In addition, the modifying module further increases the target pressure of the second pressure reducing valve, if after the value of target pressure of the second pressure reducing valve has been modified to the value greater than the corresponding value that is set by the setting module and corresponds to the consumed amount of fuel gas consumed by the fuel cell subsequent to the decrease, a value detected by the pressure sensor becomes equal to or greater than a first threshold value.

By employing above arrangement, excessive rise of pressure between two pressure reducing valves can be suppressed reliably.

In the above apparatus, it is preferable that the fuel gas supply apparatus further comprises: a pressure sensor for sensing pressure between the first pressure reducing valve and the second pressure reducing valve. In addition, the modifying module reduces the target pressure of the second pressure reducing valve, if after the value of target pressure of the second pressure reducing valve has been modified to the value greater than the corresponding value that is set by the setting module and corresponds to the consumed amount of fuel gas consumed by the fuel cell subsequent to the decrease, a value detected by the pressure sensor becomes equal to or less than a second threshold value.

By employing above arrangement, after excessive rise of pressure between two pressure reducing valves has been suppressed, the fuel gas between the two pressure reducing valves does not flow out via the second pressure reducing valve to the fuel cell on the downstream side, and thus the fuel gas can be utilized effectively.

In the above apparatus, it is preferable that the modified value modified by the modifying module to the value greater than the corresponding value that is set by the setting module and corresponds to the consumed amount of fuel gas consumed by the fuel cell subsequent to the decrease is set, such that fuel gas in a significant amount flows into the fuel cell. The significant amount is equal to or less than a leakage amount of fuel gas permeating from an anode side to a cathode side via an electrolyte membrane of the fuel cell.

By employing above arrangement, even if the fuel gas between the two pressure reducing valves flows into the fuel cell on the downstream side, the amount of fuel gas in the fuel cell does not increase. Thus, a rise of pressure in the fuel cell and damage to the fuel cell can be suppressed.

The second apparatus of the present invention is a fuel gas supply apparatus for supplying fuel gas to a fuel cell. The fuel gas supply apparatus comprises: a gas passage in which fuel gas to be supplied to the fuel cell flows; a first pressure reducing valve provided to the gas passage; a second pressure reducing valve provided to the gas passage and disposed at a downstream side of the first pressure reducing valve; and a flow passage that causes fuel gas on a upstream side of the second pressure reducing valve to flow to a downstream side of the second pressure reducing valve, in a state that the second pressure reducing valve is constricted to a maximum extent.

With this apparatus, even where the consumed amount of fuel gas decreases and the two pressure reducing valves are set to the maximum constricted state, the fuel gas between the two pressure reducing valves flows out to the fuel cell on the downstream side via the flow passage, and thus excessive rise of pressure between the two pressure reducing valves can be suppressed.

In the above apparatus, the flow passage may be provided to inside of the second pressure reducing valve.

For example, in the above apparatus, the second pressure reducing valve may comprises: a needle valve having a distal end portion of substantially tapered shape; and a seat portion corresponding to the distal end portion of the needle valve. The flow passage may be formed between the distal end portion and the seat portion, by means of a concave portion or a convex portion provided to at least one of the distal end portion and the seat portion.

Alternatively, in the above apparatus, the flow passage may be disposed to outside of the second pressure reducing valve, and may include a connecting passage connecting the upstream side and the downstream side of the second pressure reducing valve.

In the above apparatus, the flow passage is preferable to be provided such that, in a state that the second pressure reducing valve is constricted to a maximum extent, fuel gas in a significant amount flows into the fuel cell, wherein the significant amount is equal to or less than a leakage amount of fuel gas permeating from an anode side to a cathode side via an electrolyte membrane of the fuel cell.

By employing the above arrangement, even if the fuel gas between the two pressure reducing valves flows into the fuel cell on the downstream side, the amount of fuel gas in the fuel cell does not increase. Thus, a rise of pressure in the fuel cell and damage to the fuel cell can be suppressed.

The third apparatus of the present invention is a fuel gas supply apparatus for supplying fuel gas to a fuel cell. The fuel gas supply apparatus comprises: a gas passage in which fuel gas to be supplied to the fuel cell flows; a first pressure reducing valve provided to the gas passage; and a second pressure reducing valve provided to the gas passage and disposed at a downstream side of the first pressure reducing valve. The second pressure reducing valve is configured to be set to a closed state after the first pressure reducing valve has been set to a closed state, if a consumed amount of fuel gas consumed by the fuel cell decreases.

With this apparatus, the fuel gas between the two pressure reducing valves flows out to the fuel cell on the downstream side before the second pressure reducing valve is set to the closed state, and thus excessive rise of pressure between the two pressure reducing valves can be suppressed.

The first apparatus of the present invention is attained in a method aspect. For example, a method of the present invention is a method for controlling a fuel gas supply apparatus that supplies fuel gas to a fuel cell. The fuel gas supply apparatus comprises: a gas passage in which fuel gas to be supplied to the fuel cell flows; a first pressure reducing valve provided to the gas passage; and a second pressure reducing valve provided to the gas passage and disposed at a downstream side of the first pressure reducing valve. The method comprises the steps of: (a) setting a value of target pressure at a downstream side of the second pressure reducing valve, to a value depending on a consumed amount of fuel gas consumed by the fuel cell; and (b) if the consumed amount decreases by a prescribed amount or more, modifying the value of target pressure of the second pressure reducing valve to a value greater than a corresponding value that corresponds to the consumed amount subsequent to the decrease.

It should be noted that the present invention may be actualized by a diversity of applications such as a fuel gas supply apparatus, a fuel cell system including the fuel gas supply apparatus and a fuel cell, an apparatus mounted with the fuel cell system (e.g. a movable body), a control method for these apparatuses, computer programs that attain these methods or functions of these apparatuses, recording media in which such computer programs are recorded, and data signals that include such computer programs and are embodied in carrier waves.

BRIEF DESCRIPTION OF THE DRAWINGS

FIGS. 4(a)-4(f) are illustrations showing operation of the fuel gas supply system in the First Embodiment;

FIG. 5 is a flowchart showing the procedure for control of the second pressure reducing valve 218 in a Modification Example of the First Embodiment;

FIGS. 6(a)-6(f) are illustrations showing operation of the fuel gas supply system in the Modification Example of the First Embodiment;

FIGS. 9(a)-9(e) are illustrations showing operation of the fuel gas supply system in the Second Embodiment;

FIGS. 15(a)-15(e) are illustrations showing operation of the fuel gas supply system in the Third Embodiment.

BEST MODE FOR CARRYING OUT THE INVENTION

Embodiments of the present invention are discussed below based on examples in the following order.

A. First Embodiment:
A-1. Overall Configuration of Fuel Cell System:
A-2. Operation of Fuel Gas Supply System in a Comparative Example:
A-3 Operation of Fuel Gas Supply System in the First Embodiment:
A-4. Modification Example of First Embodiment:
B. Second Embodiment:
B-1. Modification Example 1 of Second Embodiment:
B-2. Modification Example 2 of Second Embodiment:
B-3. Modification Example 3 of Second Embodiment:
B-4. Modification Example 4 of Second Embodiment:
C. Third Embodiment:

A. First Embodiment

A-1. Overall Configuration of Fuel Cell System

Figure 1:
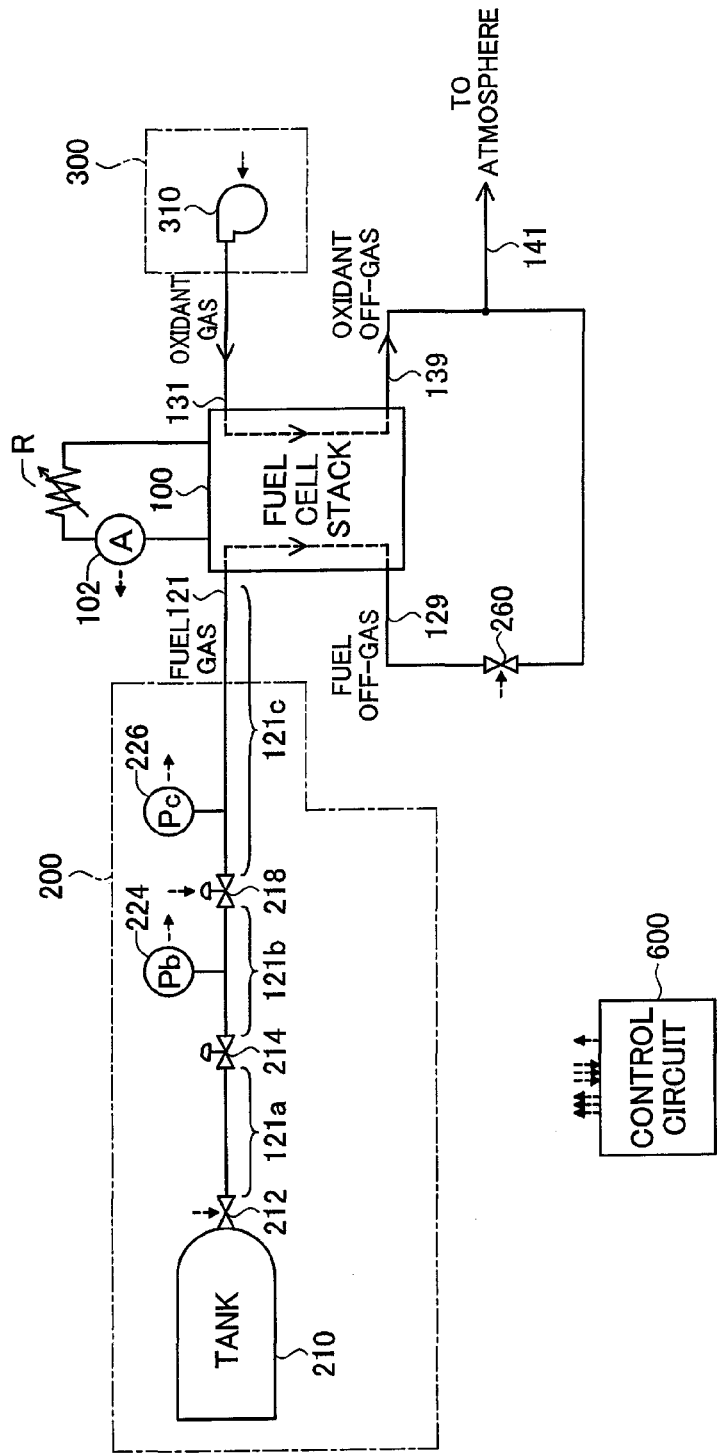
FIG. 1 is an illustration showing the general configuration of a fuel cell system in the First Embodiment.

FIG. 1 is an illustration showing the general configuration of a fuel cell system in the First Embodiment. This fuel cell system is installed onboard a vehicle. As illustrated, the fuel cell system includes a fuel cell stack 100, a fuel gas supply system 200, and an oxidant gas supply system 300.

The fuel cell stack 100, using a fuel gas (hydrogen gas) supplied by the fuel gas supply system 200 and an oxidant gas (air) supplied by the oxidant gas supply system 300, generates electricity. Electrical power is then supplied to a load R connected to the fuel cell stack 100. In the present embodiment, an ammeter 102 for measuring the electric current flowing to the load R is disposed between the fuel cell stack 100 and the load R.

The fuel gas supply system 200 includes a tank 210 for storing the fuel gas (hydrogen gas) at high pressure, and the fuel gas is supplied via a fuel gas passage 121 to the fuel cell stack 100. The tank 210 is furnished with a first shutoff valve 212, and if the first shutoff valve 212 is set to the open state, fuel gas is delivered into the fuel gas passage 121. In the fuel gas passage 121, a first pressure reducing valve 214 and a second pressure reducing valve 218 are disposed in this order. Each of the first and second pressure reducing valves 214, 218 includes a diaphragm, and is a valve whose degree of opening is adjusted mechanically depending on the pressure at the downstream side thereof. The first pressure reducing valve 214 reduces pressure in such a way that pressure in the fuel gas passage 121 at the downstream side thereof is equal to a first target pressure which is relatively high. The second pressure reducing valve 218 reduces pressure in such a way that pressure in the fuel gas passage 121 at the downstream side thereof is equal to a second target pressure which is relatively low. In particular, in the present embodiment, the target pressure of the first pressure reducing valve 214 is set to a fixed value, while the target pressure of the second pressure reducing valve 218 is adjustable.

Hereinbelow, in the fuel gas passage 121, the section between the first shutoff valve 212 and the first pressure reducing valve 214 is called the first partial passage 121a, the section between the first pressure reducing valve 214 and the second pressure reducing valve 218 is called the second partial passage 121b, and the section between the second pressure reducing valve 218 and the fuel cell stack 100 is called the third partial passage 121c.

In the second partial passage 121b, there is disposed a first pressure sensor 224 for sensing pressure Pb in the second partial passage 121b (specifically, pressure at the downstream side of the first pressure reducing valve 214). Also, in the third partial passage 121c, there is disposed a second pressure sensor 226 for sensing pressure Pc in the third partial passage 121c (specifically, pressure at the downstream side of the second pressure reducing valve 218).

The oxidant gas supply system 300 includes a blower for delivering the oxidant gas (air), and the oxidant gas is supplied via an oxidant gas passage 131 to the fuel cell stack 100.

The used fuel off-gas expelled from the fuel cell stack 100 passes through a fuel off-gas passage 129. A second shutoff valve 260 is disposed in the fuel off-gas passage 129. The second shutoff valve 260 is intermittently set to the open state, whereby the fuel off-gas is expelled from the fuel cell stack 100. Also, the used oxidant off-gas expelled from the fuel cell stack 100 passes through an oxidant off-gas passage 139. The fuel off-gas passage 129 and the oxidant off-gas passage 139 converge at the downstream side, and the fuel off-gas and the oxidant off-gas are mixed within a convergent passage 141 and released into the atmosphere.

The fuel cell system further includes a control circuit 600 for controlling operation of the system as a whole. The control circuit 600 acquires a detected result by the ammeter 102, and detected results by the two pressure sensors 224, 266. The control circuit 600 controls opening/closing of the two shutoff valves 212, 260 and the operation of the blower 310.

In particular, the control circuit 600 of the present embodiment sets the target pressure of the second pressure reducing valve 218, depending on the amount of fuel gas consumed by the fuel cell stack 100. Specifically, the control circuit 600 sets the target pressure of the second pressure reducing valve 218, depending on the detected result by the ammeter 102. For example, if the output current detected by the ammeter 102 is relatively small, the amount of fuel gas consumed in the fuel cell stack 100 is relatively small, and therefore the control circuit 600 sets the target pressure of the second pressure reducing valve 218 to a relatively small value. Note that the output current of the fuel cell stack 100 is relatively small, if the vehicle is driving at relatively low speed, for example.

Moreover, if the amount of fuel gas consumed by the fuel cell stack 100 has decreased sharply, the control circuit 600 adjusts the target pressure of the second pressure reducing valve 218, thereby suppressing excessive rise of the pressure Pb within the second partial passage 121b. Specifically, if the output current detected by the ammeter 102 has decreased sharply, the control circuit 600 increases the target pressure of the second pressure reducing valve 218. Note that the output current of the fuel cell stack 100 decreases sharply in the event of sharp deceleration of the vehicle, for example. Also, the control circuit 600 can further increase the target pressure of the second pressure reducing valve 218, in consideration of the detection result of the pressure Pb within the second partial passage 121b detected by the first pressure sensor 224.

It should be noted that the control circuit 600 in the present embodiment corresponds to a setting module and a modifying module in the present invention. The first pressure sensor 224 in the present embodiment corresponds to the pressure sensor in the present invention. In the present embodiment, while the second pressure sensor 226 is provided for convenience in description, it is possible to omit the second pressure sensor 226.

A-2. Operation of Fuel Gas Supply System in a Comparative Example

Before proceeding to a description of operation of the fuel gas supply system 200 in the present embodiment, the operation of a fuel gas supply system 200' (not illustrated) in a Comparative Example is described below. The fuel gas supply system 200' of the Comparative Example is substantially the same as the fuel gas supply system 200 of FIG. 1, but the second pressure reducing valve 218' (not illustrated) is modified. Specifically, in the First Embodiment, the target pressure of the second pressure reducing valve 218 is adjustable by the control circuit 600. In the Comparative Example, however, the target pressure of the second pressure reducing valve 218' (not illustrated) is set to a fixed value, and is not adjustable by the control circuit 600.

FIGS. 2(a)-2(e) are illustrations showing operation of the fuel gas supply system in the Comparative Example. FIGS. 2(a)-2(e) respectively depict changes over time of: the output current of the fuel cell stack 100; the degree of opening of the second pressure reducing valve 218'; the degree of opening of the first pressure reducing valve 214; the pressure Pc in the third partial passage 121c detected by the second pressure sensor 226; and the pressure Pb in the second partial passage 121b detected by the first pressure sensor 224.

Figure 2:
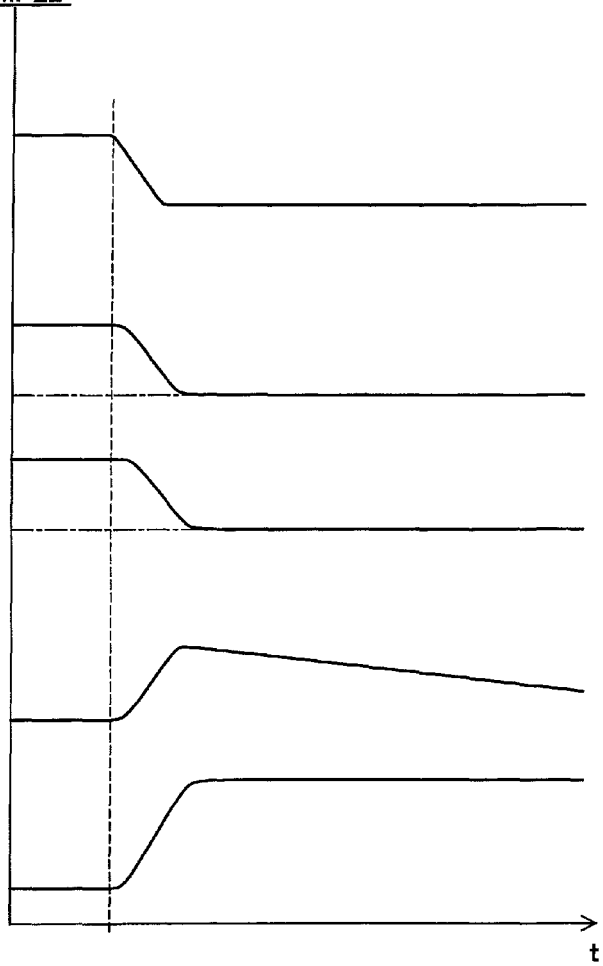
FIGS. 2(a)-2(e) are illustrations showing operation of the fuel gas supply system in the Comparative Example.

When the vehicle decelerates sharply, the output current of the fuel cell stack 100 decreases sharply (see FIG. 2(a)). At this time, since fuel gas is not consumed in the fuel cell stack 100, the pressure Pc in the third partial passage 121c rises (see FIG. 2(d)). Thereby, the second pressure reducing valve 218' closes gradually and is ultimately set to the closed state (see FIG. 2(b)). Also, at this time, the pressure Pb in the second partial passage 121b rises (see FIG. 2(e)). Thereby, the first pressure reducing valve 214 closes gradually and is ultimately set to the closed state (see FIG. 2(c)).

An electrolyte membrane, not shown, is provided within the fuel cell stack 100. In the fuel cell stack 100, the fuel gas leaks from the fuel gas side (anode side) to the oxidant gas side (cathode side) via the electrolyte membrane. Thus, after the second pressure reducing valve 218' has been set to the closed state, the pressure Pc in the third partial passage 121c decreases gradually (see FIG. 2(d)).

Once the first and second pressure reducing valves 214, 218' have been set to the closed state, the second partial passage 121b becomes a closed space, and therefore the pressure Pb (FIG. 2(e)) in the second partial passage 121b is maintained at a substantially constant value.

As shown in FIGS. 2(a)-2(e), in the Comparative Example, after the second pressure reducing valve 218' has been set to the closed state, the first pressure reducing valve 214 is set to the closed state. Thus, there is a risk that the pressure Pb in the second partial passage 121b becomes excessive and damages the wall of the second partial passage 121b, the mechanism on the downstream side of the first pressure reducing valve 214, the mechanism on the upstream side of the second pressure reducing valve 218', and so on.

Accordingly, in the present embodiment, the target pressure of the second pressure reducing valve 218 is controlled, in order to suppress excessive rise of the pressure Pb in the second partial passage 121b.

A-3 Operation of Fuel Gas Supply System in the First Embodiment

Figure 3:
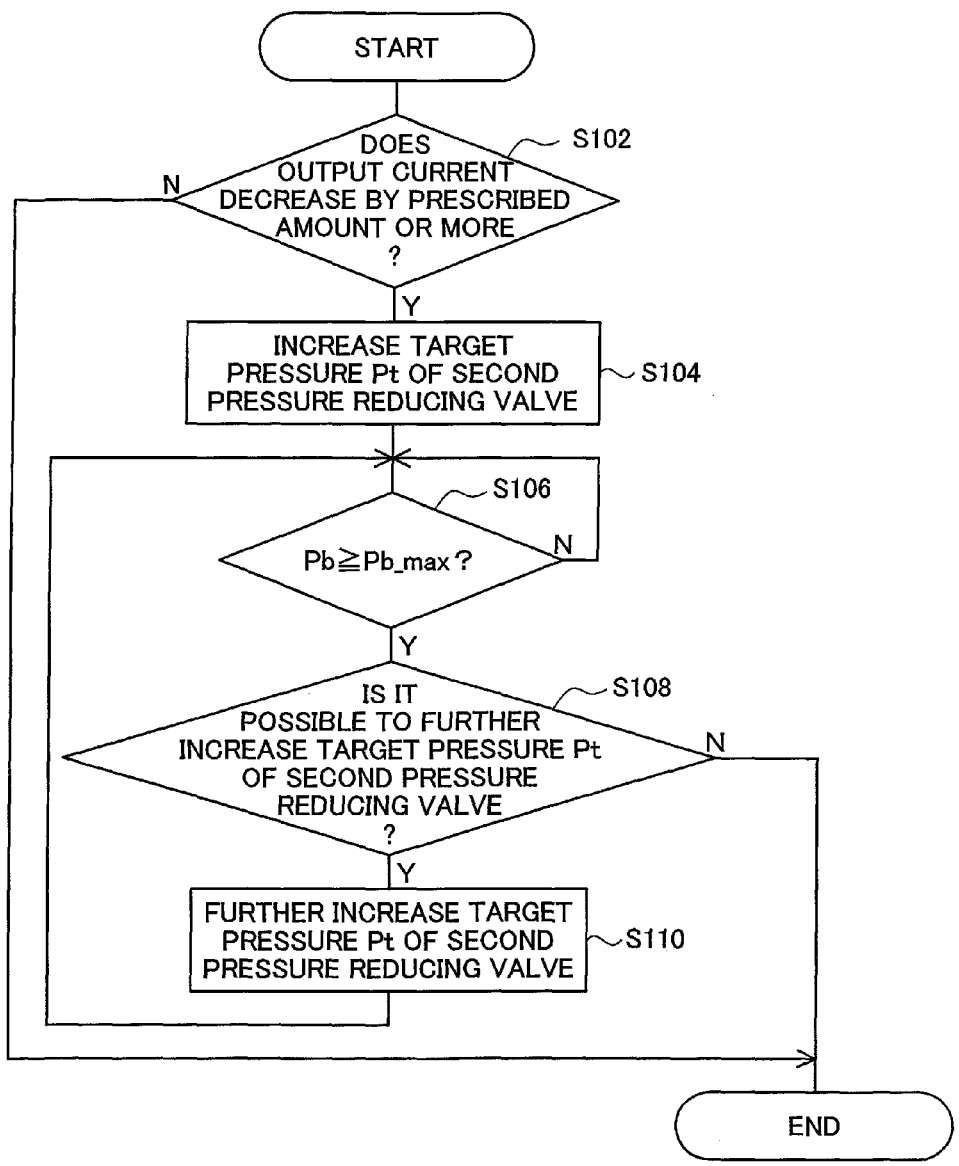
FIG. 3 is a flowchart showing the procedure of control of the second pressure reducing valve 218 in the First Embodiment.

FIG. 3 is a flowchart showing the procedure of control of the second pressure reducing valve 218 in the First Embodiment. The process of FIG. 3 is executed, for example, when the vehicle decelerates sharply. During the execution period of the process of FIG. 3, the first shutoff valve 212 is maintained in the open state. In the present embodiment, an instance in which the second shutoff valve 260 is set to the closed state during the execution period of the process of FIG. 3 is assumed.

In Step S102, the control circuit 600 acquires a detected value by the ammeter 102, and determines whether the output current of the fuel cell stack 100 has decreased by a prescribed amount or more within a predetermined period, in other words, whether the amount of fuel gas consumed by the fuel cell stack 100 has decreased by a prescribed amount or more within a predetermined period. If the vehicle decelerates, the load R of the fuel cell stack 100 decreases, and the output current of the fuel cell stack 100 decreases. At this time, in the fuel cell stack 100, the consumed amount of the fuel gas decreases. As will be apparent from this discussion, in the present embodiment, using the output current of the fuel cell stack 100, a sharp deceleration of the vehicle, in other words, a sharp decrease in the consumed amount of fuel gas, is detected.

If it is determined that the output current of the fuel cell stack 100 has decreased by a prescribed amount or more in Step S102, the process advances to Step S104, while if not determined, the process of FIG. 3 terminates.

In Step S104, the control circuit 600 increases the target pressure Pt of the second pressure reducing valve 218. Specifically, the control circuit 600 sets the value of the target pressure Pt of the second pressure reducing valve 218 to Pt+ΔPt1, and gives this setting value to the second pressure reducing valve 218. In the present embodiment, the setting value Pt+ΔPt1 is set to a value less than a prescribed value Pc_max.

The prescribed value Pc_max is a value that is determined in consideration of the portion of lowest pressure resistance at the downstream side from the second pressure reducing valve 218. In the present embodiment, since the fuel cell stack 100 has the lowest pressure resistance, the prescribed value Pc_max is determined in consideration of this pressure resistance. Where the target pressure Pt of the second pressure reducing valve 218 is set to a value less than the prescribed value Pc_max in this way, excessively high pressure Pc in the third partial passage 121c, and damage to the fuel cell stack 100, can be suppressed.

In Step S106, the control circuit 600 acquires the pressure Pb in the second partial passage 121b detected by the first pressure sensor 224, and determines whether the pressure Pb is equal to or greater than a first threshold value Pb_max. If the pressure Pb is less than the first threshold value Pb_max, the process of Step S106 is executed repeatedly. On the other hand, if the pressure Pb is equal to or greater than the first threshold value Pb_max, the process advances to Step S108. The first threshold value Pb_max is a value which is determined in consideration of the pressure resistance of the passage wall of the second partial passage 121b, the mechanism at the downstream side of the first pressure reducing valve 214, the mechanism at the upstream side of the second pressure reducing valve 218, and so on.

In Step S108, the control circuit 600 determines whether the target pressure Pt of the second pressure reducing valve 218 can be increased further. Specifically, the control circuit 600 determines whether a value Pt+ΔPt2 is a value less than a prescribed value Pc_max. If it is decided that the target pressure Pt can be increased further (specifically, where Pt+ΔPt2<Pc_max), the process advances to Step S110. If it is decided that the target pressure Pt can not be increased further (specifically, where Pt+ΔPt2≥Pc_max), the process of FIG. 3 terminates.

In Step S110, the control circuit 600 further increases the target pressure Pt of the second pressure reducing valve 218.

Specifically, the control circuit 600 sets the value of the target pressure Pt to Pt+ΔPt2, and gives the setting value to the second pressure reducing valve 218.

Subsequently, the process returns to Step S106, and the process of Step S106 is executed again.

The process of FIG. 3 is suspended if the vehicle accelerates, in other words, if the output current of the fuel cell stack increases.

Note that, in the present embodiment, the amounts of increase ΔPt1, ΔPt2 of target pressure of the second pressure reducing valve 218 in Steps S104 and S110 are pre-established. However, instead of this, the amounts of increase ΔPt1, ΔPt2 may be modified depending on the amount of decrease of output current of the fuel cell stack 100. For example, if the amount of decrease (absolute value) of output current is relatively large, the amounts of increase ΔPt1, ΔPt2 may be set to relatively large values. Also, while the value of the amount of increase ΔPt2 is typically set to a value smaller than the amount of increase ΔPt1, it could also be set to a value equal to the amount of increase ΔPt1.

FIGS. 4(a)-4(f) are illustrations showing operation of the fuel gas supply system in the First Embodiment. FIGS. 4(a)-4(f) depict operation in the event that the process of FIG. 3 is executed. FIGS. 4(a)-4(f) respectively depict changes over time of: the output current of the fuel cell stack 100; the target pressure Pt of the second pressure reducing valve 218; the degree of opening of the second pressure reducing valve 218; the degree of opening of the first pressure reducing valve 214; the pressure Pc in the third partial passage 121c; and the pressure Pb in the second partial passage 121b.

FIGS. 4(a) and 4(c)-4(f) correspond respectively to FIGS. 2(a)-2(e), and FIG. 4(b) is added. FIGS. 4(a) and 4(d) are the same as FIGS. 2(a) and 2(c). In FIGS. 4(c), 4(e) and 4(f), curves that are the same as FIGS. 2(b), 2(d), and 2(e) are shown by broken lines.

If the vehicle decelerates sharply, the output current of the fuel cell stack 100 decreases by a prescribed amount of ΔI or more (see FIG. 4(a)). Once the output current decreases, fuel gas is not consumed in the fuel cell stack 100, and therefore the pressure Pc in the third partial passage 121c rises (see FIG. 4(e)). Also, once the output current decreases, the target pressure Pt of the second pressure reducing valve 218 is reduced (see FIG. 4(b)). Thereby, the degree of opening of the second pressure reducing valve 218 is set gradually smaller (see FIG. 4(c)). Also, at this time, the pressure Pb in the second partial passage 121b rises gradually (see FIG. 4(f)). Thereby, the first pressure reducing valve 214 closes gradually and is ultimately set to the closed state (see FIG. 4(d)).

In the present embodiment, once the output current decreases, the degree of opening of the second pressure reducing valve 218 is set gradually smaller, but the second pressure reducing valve 218 is not set to the closed state. This due to the fact that, in the present embodiment, when it has been decided that the output current of the fuel cell stack 100 has decreased by a prescribed amount of ΔI or more, the control circuit 600 increases the target pressure Pt of the second pressure reducing valve 218 by ΔPt1, in Step S104 of FIG. 3 (see FIG. 4(b)). Thereby, in the present embodiment, the second pressure reducing valve 218 is not set to the closed state, but is set to the slightly open state. Thus, fuel gas inside the second partial passage 121b flows into the third partial passage 121c. As a result, in the First Embodiment, the change of pressure Pc in the third partial passage 121c is smaller than in the Comparative Example, and the pressure Pc is maintained at a substantially constant value (see FIG. 4(e)). Also, the rise of pressure Pb in the second partial passage 121b is suppressed to greater extent than in the Comparative Example (see FIG. 4(f)).

In FIG. 4(e), after the target pressure Pt of the second pressure reducing valve 218 has increased by ΔPt1, the pressure Pc in the third partial passage 121c is substantially constant. This is because the amount of fuel gas (i.e. inflow amount) flowing into the fuel cell stack 100 per unit of time is substantially equal to the amount of fuel gas (i.e. leakage amount) leaking from the fuel gas side (anode side) to the oxidant gas side (cathode side) via the electrolyte membrane in the fuel cell stack 100 per unit of time. The above inflow amount is preferably a significant amount equal to or less than the leakage amount. By so doing, the fuel gas amount in the fuel cell stack 100 does not increase, so rise of pressure in the fuel cell stack and damage to the fuel cell stack can be suppressed. In particular, it is preferable for the inflow amount to be as large an amount as possible, while equal to or less than the leakage amount. By so doing, rise of the pressure Pb in the second partial passage 121b can be suppressed sufficiently.

As described above, in the present embodiment, if the consumed amount of fuel gas decreases by a prescribed amount or more, the value of the target pressure Pt of the second pressure reducing valve 218 is set to a value greater than the value corresponding to the consumed amount after the decrease. Therefore, the second pressure reducing valve 218 is not set to the closed state, but is set to a significant degree of opening. Thus, the fuel gas in the second partial passage 121b flows out to the fuel cell stack 100 on the downstream side, and as a result, excessive rise of the pressure Pb in the second partial passage 121b can be suppressed.

In particular, in the present embodiment, as shown in FIG. 3, if the pressure Pb in the second partial passage 121b reaches the first threshold value Pb_max or above, the target pressure Pt of the second pressure reducing valve 218 can be increased further, and the degree of opening of the second pressure reducing valve 218 can be set larger. Thus, excessive rise of the pressure Pb in the second partial passage 121b can be reliably suppressed.

A-4. Modification Example of First Embodiment

FIG. 5 is a flowchart showing the procedure for control of the second pressure reducing valve 218 in a Modification Example of the First Embodiment. FIG. 5 is substantially similar to FIG. 3, except that Steps S112 and S114 are added. In association therewith, Steps S106a and 108a are modified.

In the Modification Example, if it is determined in Step S106a that the pressure Pb in the second partial passage 121b is less than the first threshold value Pb_max, the process advances to Step S112.

In Step S112, the control circuit 600 determines whether the pressure Pb acquired in Step S106 is equal to or less than a second threshold value Pb_min. The second threshold value Pb_min is a value smaller than the first threshold value Pb_max. If the pressure Pb is equal to or less than the second threshold value Pb_min, the process advances to Step S114. On the other hand, if the pressure Pb is greater than the second threshold value Pb_min, the process returns to Step S106.

In Step S114, the control circuit 600 reduces the target pressure Pt of the second pressure reducing valve 218. At this time, the degree of opening of the second pressure reducing valve 218 becomes small. In the present embodiment, the target pressure Pt of the second pressure reducing valve 218 is reduced to a value corresponding to the output current of the fuel cell stack 100. However, it is acceptable to instead set the target pressure Pt of the second pressure reducing valve 218 so as to be reduced by a prescribed value ΔPt3. In general, if the pressure Pb in the second partial passage 121b has reached the second threshold value Pb_min or below, the target pressure of the second pressure reducing valve 218 should be reduced.

In the Modification Example, if it is determined in Step S108a that the target pressure Pt of the second pressure reducing valve 218 cannot be reduced further (i.e. where Pt+ΔPt2≥Pc_max), the process returns to Step S106a.

FIGS. 6(a)-6(f) are illustrations showing operation of the fuel gas supply system in the Modification Example of the First Embodiment. FIGS. 6(a)-6(f) depicts operation in the event of execution of the process of FIG. 5. FIGS. 6(a)-6(f) correspond respectively to FIGS. 4(a)-4(f). FIGS. 6(a) and 6(d) are the same as FIGS. 2(a) and 2(c). In FIGS. 6(c), 6(e) and 6(f), curves that are the same as FIGS. 2(b), 2(d), and 2(e) are shown by broken lines. Operation up to time ta in the drawing is the same as the First Embodiment.

As discussed in the First Embodiment (FIG. 4(f)), after the target pressure Pt of the second pressure reducing valve 218 has increased by ΔPt1, the fuel gas in the second partial passage 121b flows out to the third partial passage 121c, and thus the pressure Pb in the second partial passage 121b decreases gradually (see FIG. 6(f)). Then, when the pressure Pb reaches the second threshold value Pb_min or below at time ta, the control circuit 600 reduces the target pressure Pt of the second pressure reducing valve 218 to a value corresponding to the output current of the fuel cell stack 100 in Step S112 of FIG. 5 (see FIG. 6(b)). At this time, the degree of opening of the second pressure reducing valve 218 is set gradually smaller, and ultimately the second pressure reducing valve 218 is set to the closed state (FIG. 6(c)).

Once the second pressure reducing valve 218 is set to the closed state, the pressure Pc in the third partial passage 121c gradually decreases (see FIG. 6(e)). This is because the aforementioned inflow amount is substantially zero.

Also, once the second pressure reducing valve 218 is set to the closed state, the fuel gas in the second partial passage 121b does not flow out. Thus, the pressure Pb in the second partial passage 121b is maintained at a substantially constant value.

Note that in FIGS. 6(a)-6(f), the second pressure reducing valve 218 is ultimately set to the closed state, however, instead of this, it may be set to a slightly open state.

As discussed above, in the Modification Example of the First Embodiment, when the pressure Pb in the second partial passage 121b has reached the second threshold value Pb_min or below, the target pressure Pt of the second pressure reducing valve 218 is reduced. Thus, the degree of opening of the second pressure reducing valve 218 becomes smaller. Therefore, inflow of fuel gas in the second partial passage 121b into the fuel cell stack 100 can be suppressed, and thus the amount of fuel gas leaking via the electrolyte membrane in the fuel cell stack 100 can be reduced, and as a result the fuel gas can be utilized effectively.

B. Second Embodiment

Figure 7:
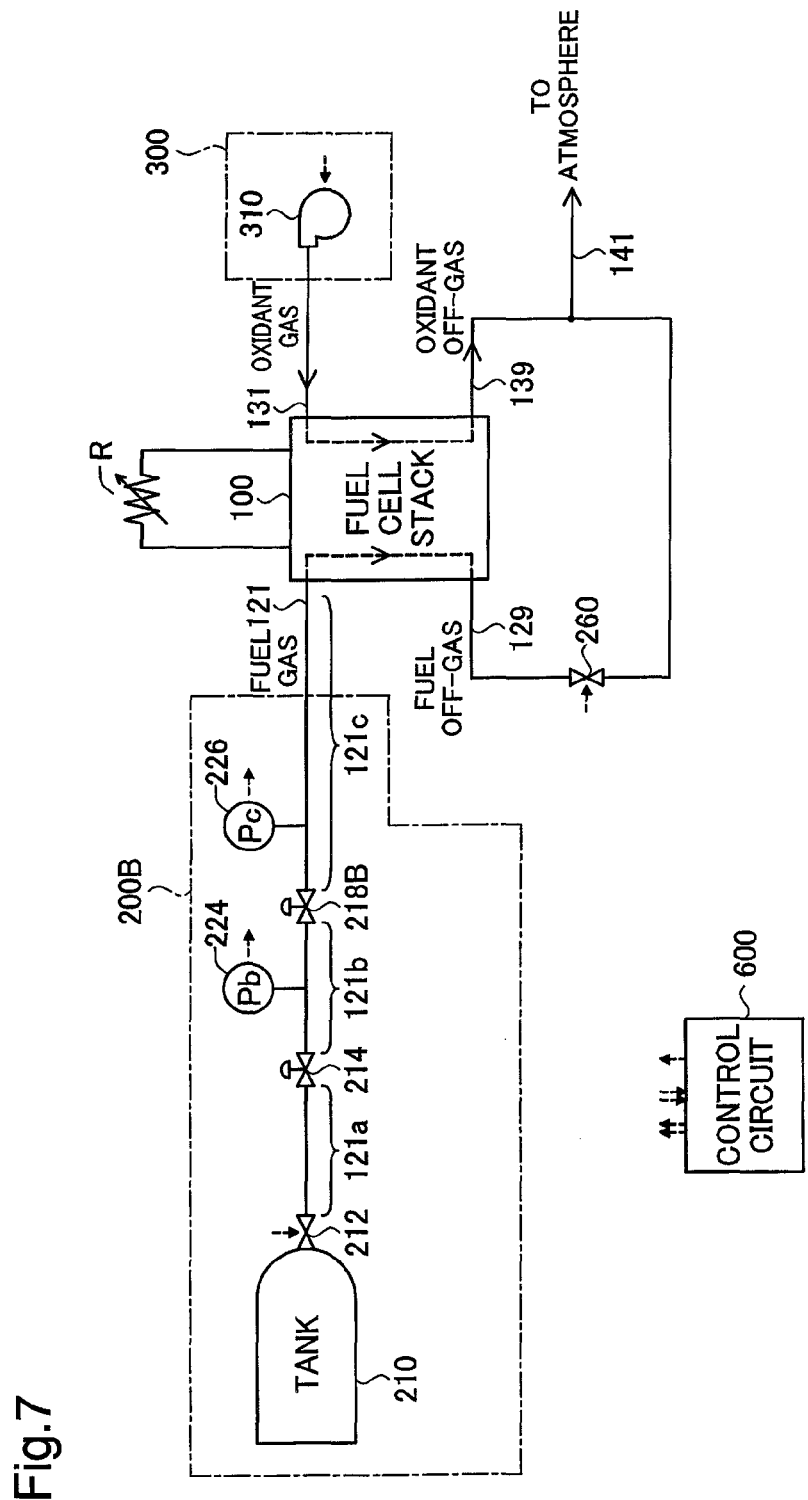
FIG. 7 is an illustration showing the general configuration of the fuel cell system in the Second Embodiment.

FIG. 7 is an illustration showing the general configuration of the fuel cell system in the Second Embodiment. FIG. 7 is substantially similar to FIG. 1, except that the ammeter 102 is omitted. Also, the second pressure reducing valve 218B of the fuel gas supply system 200B is modified. Specifically, the target pressure of the second pressure reducing valve 218B is set to a fixed value, and is not adjustable by the control circuit 600.

Figure 8A:
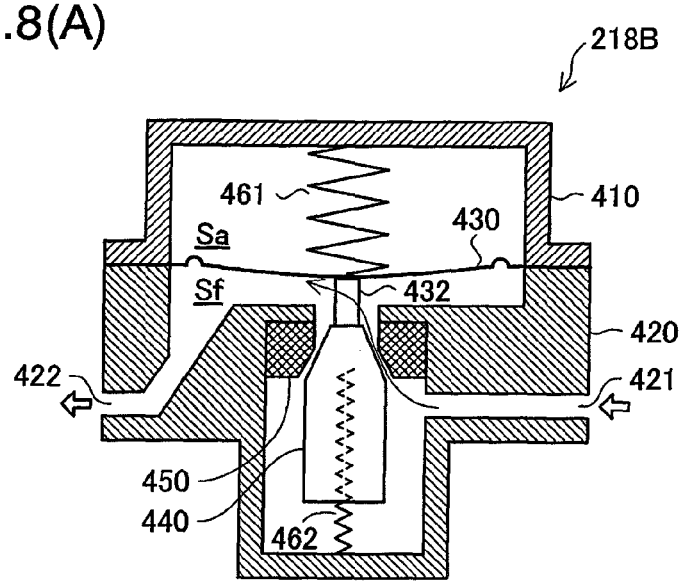
FIGS. 8(A) and 8(B) are illustrations typically showing the internal structure of the second pressure reducing valve 218B in the Second Embodiment.
Figure 8B:
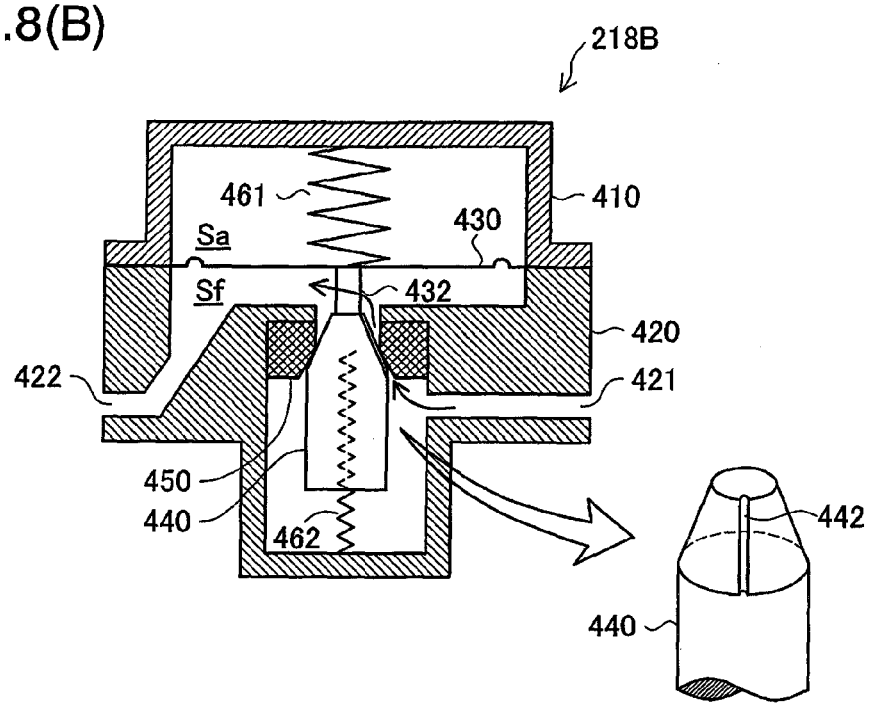

FIGS. 8(A) and 8(B) are illustrations typically showing the internal structure of the second pressure reducing valve 218B in the Second Embodiment. FIG. 8(A) shows the second pressure reducing valve 218B when set to the open state, and FIG. 8(B) shows the second pressure reducing valve 218B when set to the closed state.

As illustrated, the second pressure reducing valve 218B includes an upper housing 410, a lower housing 420, a diaphragm 430, a needle valve 440, a seat portion 450, an upper spring 461, and a lower spring 462.

The diaphragm 430 is sandwiched between the upper housing 410 and the lower housing 420. One end of the upper spring 461 is fastened to the upper face of the diaphragm 430, while the other end of the upper spring 461 is fastened to inside face of the upper housing 410. One end of a cylinder member 432 of substantially cylindrical shape is fastened to the lower face of the diaphragm 430. The other end of the cylinder member 432 is disposed so as to contact with the needle valve 440, but is not fastened to the needle valve 440. The pressure in a space Sa enclosed by the upper housing 410 and the diaphragm 430 is equal to atmospheric pressure.

In the lower housing 420, an inflow opening 421 for inflow of fuel gas, and an outflow opening 422 for outflow of fuel gas are provided. An internal passage for the fuel gas to pass through is formed between the inflow opening 421 and the outflow opening 422. One end of the lower spring 462 is fastened to the needle valve 440, while the other end of the lower spring 462 is fastened to the inside face of the lower housing 420. The annular seat portion 450 is fastened to the lower housing 420, and the substantially tapered distal end portion of the needle valve 440 contacts with the annular seat portion 450.

The upper spring 461 urges the diaphragm 430 downward in the drawing. The pressure in a space Sf below the diaphragm 430 is typically higher than the pressure in the space Sa (atmospheric pressure), and urges the diaphragm 430 upward in the drawing. The pressure in the space Sf is equal to the pressure on the downstream side of the second pressure reducing valve 218B. The lower spring 462 urges the needle valve 440 upward in drawing, and the needle valve 440, via the cylindrical member 432, urges the diaphragm 430 upward in the drawing. The target pressure at the downstream side of the second pressure reducing valve 218B is determined primarily by the urging force of the upper spring 461.

Where the pressure in the space Sf is lower than the target pressure of the second pressure reducing valve 218B, the distal end portion of the needle valve 440 and the seat portion 450 is not in contact but separated, as shown in FIG. 8(A). At this time, fuel gas flow through a gap formed between the needle valve 440 and the seat portion 450.

Where the pressure in the space Sf is equal to or greater than the target pressure of the second pressure reducing valve 218B, the substantially tapered distal end portion of the needle valve 440 and the seat portion 450 is in contact, as shown in FIG. 8(B). Ordinarily at this time, flow of fuel gas would be prevented. In the present embodiment, however, slight flow of fuel gas is permitted even where the needle valve 440 and the seat portion 450 are in contact.

Specifically, in the present embodiment, a single groove 442 of linear shape is formed in the substantially tapered distal end portion of the needle valve 440. The groove 442 is formed along a generatrix of truncated cone shape of the distal end portion. Thus, in the present embodiment, as shown in FIG. 8(B), slight flow of fuel gas is permitted even where the needle valve 440 and the seat portion 450 are in contact.

Note that in the present embodiment, a single linear groove 442 is provided to distal end portion of the needle valve 440, but instead of this, a plurality of grooves may be provided.

FIGS. 9(a)-9(e) are illustrations showing operation of the fuel gas supply system in the Second Embodiment. FIGS. 9(a)-9(e) correspond respectively to FIGS. 2(a)-2(e). FIGS. 9(a) and 9(c) are the same as FIGS. 2(a) and 2(c). In FIGS. 9(b), 9(d) and 9(e), curves that are the same as FIGS. 2(b), 2(d), and 2(e) are shown by broken lines.

As described above, when the vehicle decelerates, the output current of the fuel cell stack 100 decreases (see FIG. 9(a)). At this time, since fuel gas is not consumed in the fuel cell stack 100, the pressure Pc in the third partial passage 121c rises (FIG. 9(d)). Thereby, the second pressure reducing valve 218B closes gradually and is ultimately set to the closed state (see FIG. 9(b)). Also, at this time, the pressure Pb in the second partial passage 121b rises (see FIG. 9(e)). Thereby, the first pressure reducing valve 214 closes gradually and is ultimately set to the closed state (see FIG. 9(c)).

However, in the present embodiment, even in a state of the second pressure reducing valve 218B having been set to the closed state, slight flow of fuel gas is possible via the groove 442 provided in the distal end portion of the needle valve 440. Specifically, in the present embodiment, it can be said that the second pressure reducing valve 218B has a substantially significant degree of opening, even where set to the state of maximum constriction structurally. Thus, in FIG. 9(b), the second pressure reducing valve 218B is depicted as having a significant degree of opening in the state of maximum constriction.

As described above, the second pressure reducing valve 218B permits flow of fuel gas even in the state of maximum constriction. Thus, fuel gas in the second partial passage 121b can flow into the third partial passage 121c. As a result, in the Second Embodiment, the change of pressure Pc in the third partial passage 121c is smaller than in the Comparative Example, and the pressure Pc decreases more gradually than in the Comparative Example (see FIG. 9(d)). Also, the rise of pressure Pb in the second partial passage 121b is suppressed, in comparison with the Comparative Example (see FIG. 9(e)).

In FIG. 9(d), the pressure Pc in the third partial passage 121c decreases gradually, as discussed above. This is because the amount of fuel gas (inflow amount) flowing into the fuel cell stack 100 per unit of time is smaller than the amount of fuel gas (leakage amount) leaking from the fuel gas side to the oxidant gas side via the electrolyte membrane in the fuel cell stack 100 per unit of time.

As discussed above, in the present embodiment, the second pressure reducing valve 218B is furnished with the groove 442 (flow passage) that permits flow of fuel gas with the gap between the needle valve 440 and the seat portion 450 of the second pressure reducing valve 218B in the state of maximum constriction structurally. Thereby, fuel gas in the second partial passage 121b flows out to the fuel cell stack on the downstream side via the groove 442 in the second pressure reducing valve 218B, and as a result, excessive rise of the pressure Pb in the second partial passage 121b can be suppressed.

In the present embodiment, the groove 442 is provided so that, with the second pressure reducing valve 218B in the state of maximum constriction, the above inflow amount is smaller than the leakage amount. The inflow amount is preferably a significant amount equal to or less than the leakage amount. By so doing, the fuel gas amount in the fuel cell stack 100 does not increase, and thus damage to the fuel cell stack due to a rise of pressure in the fuel cell stack can be suppressed. In particular, the inflow amount is preferably as large an amount as possible, while equal to or less than the leakage amount. By so doing, rise of the pressure Pb in the second partial passage 121b can be suppressed sufficiently.

B-1. Modification Example 1 of Second Embodiment

Figure 10:
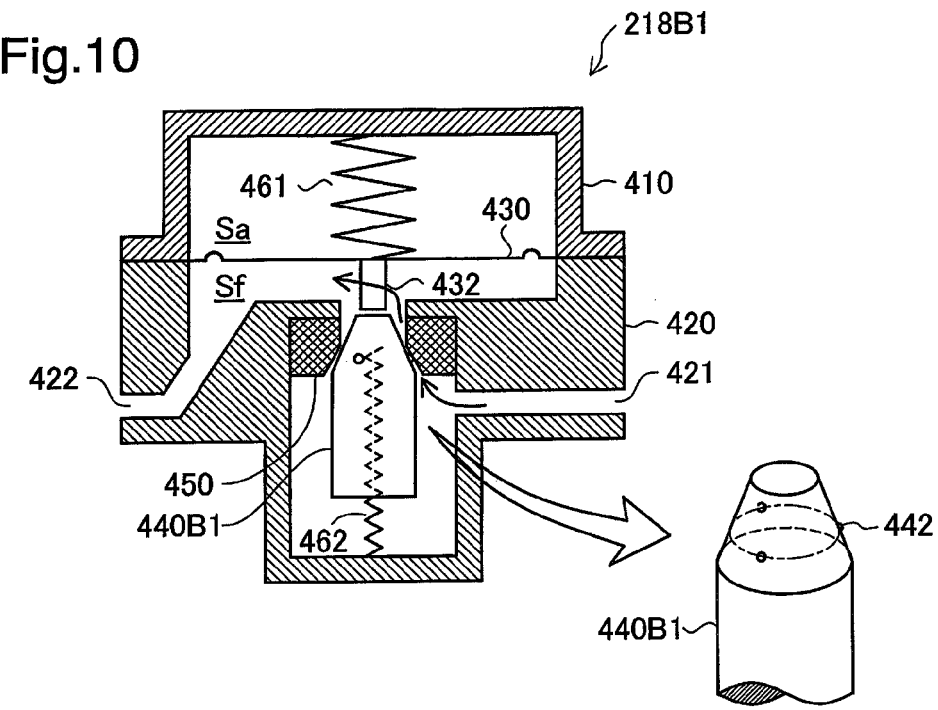
FIG. 10 is an illustration showing a second pressure reducing valve 218B1 in Modification Example 1 of the Second Embodiment.

FIG. 10 is an illustration showing a second pressure reducing valve 218B1 in Modification Example 1 of the Second Embodiment. As illustrated, in Modification Example 1, a needle valve 440B1 is modified. Specifically, three convex portions 444 of semi-spherical shape are formed in the distal end portion of the needle valve 440B1. The convex portions 444 may be affixed to the needle valve 440B1 by welding, for example.

Where Modification Example 1 is employed as well, the second pressure reducing valve 218B, in the state of maximum constriction, can cause fuel gas to pass via flow passages formed by the convex portions 444.

B-2. Modification Example 2 of Second Embodiment

Figure 11:
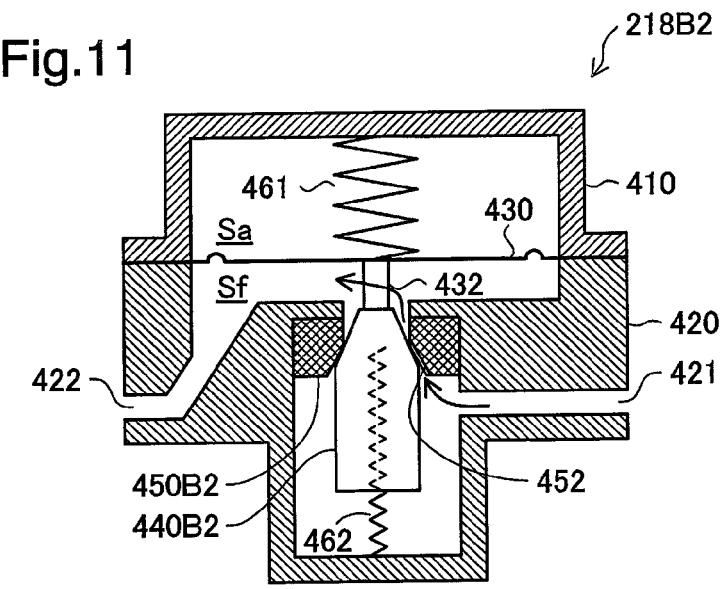
FIG. 11 is an illustration showing a second pressure reducing valve 218B2 in Modification Example 2 of the Second Embodiment.

FIG. 11 is an illustration showing a second pressure reducing valve 218B2 in Modification Example 2 of the Second Embodiment. As illustrated, in Modification Example 2, a needle valve 440B2 and a seat portion 450B2 are modified. Specifically, no groove is provided to the needle valve 440B2, while a single groove 452 of linear shape is provided to the inside face of the seat portion 450B2 (i.e. to the face thereof contacting the needle valve 440). Note that the seat portion 450B2 may also be provided with a plurality of grooves.

Where Modification Example 2 is employed as well, the second pressure reducing valve 218B2, in the state of maximum constriction, can cause fuel gas to pass via the groove 452 (flow passage).

As shown in FIGS. 8(A)-8(B), 10, and 11, flow passages that permit flow of fuel gas with the second pressure reducing valve in the state of maximum constriction can be formed between the distal end portion of the needle valve and the seat portion, by means of concave portions (see FIGS. 8(A)-8(B), and FIG. 11) or convex portions (see FIG. 10) furnished to at least one of the distal end portion of the needle valve and the seat portion.

B-3. Modification Example 3 of Second Embodiment

Figure 12:
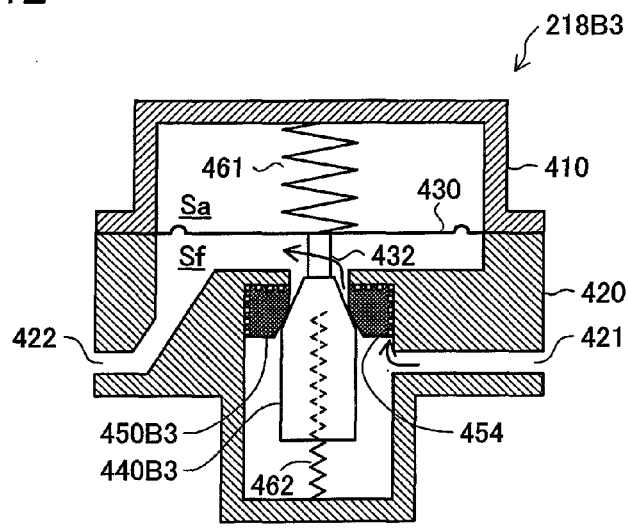
FIG. 12 is an illustration showing a second pressure reducing valve 218B3 in Modification Example 3 of the Second Embodiment.

FIG. 12 is an illustration showing a second pressure reducing valve 218B3 in Modification Example 3 of the Second Embodiment. As illustrated, in Modification Example 3, a needle valve 440B3 and a seat portion 450B3 are modified. The needle valve 440B3 is the same as the needle valve 440B2 of FIG. 11. A plurality of convex portions 454 are formed in the side face and one bottom face of the annular seat portion 450B3 (i.e. the two faces that contact the lower housing 420).

Where Modification Example 3 is employed as well, the second pressure reducing valve 218B3, in the state of maximum constriction, can cause fuel gas to pass via the flow passages formed by the plurality of convex portions 454.

B-4. Modification Example 4 of Second Embodiment

In FIGS. 8(A)-8(B) and FIGS. 10 through 12, flow passages permitting flow of fuel gas with the second pressure reducing valve in the state of maximum constriction are provided in the interior of the second pressure reducing valve, however, they may be provided on the exterior of the second pressure reducing valve instead.

Figure 13:
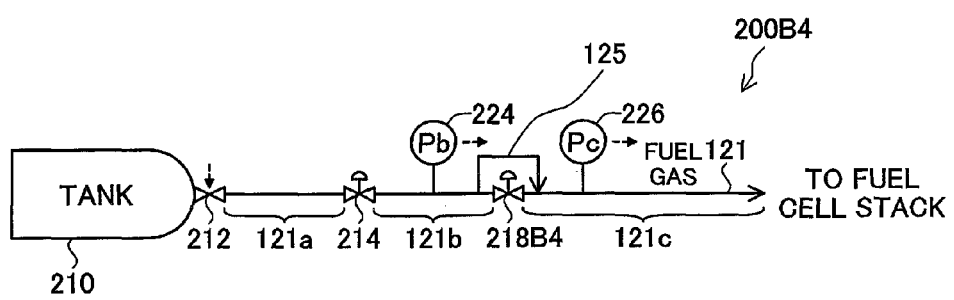
FIG. 13 is an illustration showing a fuel gas supply system 200B4 in Modification Example 4 of the Second Embodiment.

FIG. 13 is an illustration showing a fuel gas supply system 200B4 in Modification Example 4 of the Second Embodiment. This fuel gas supply system 200B4 is substantially similar to the fuel gas supply system 200 of FIG. 7, except that a second pressure reducing valve 218B4 is modified and a bypass passage 125 is added.

The second pressure reducing valve 218B4 is substantially the same as the second pressure reducing valve 218B of FIG. 8, except that a groove 442 is not provided to the needle valve. Thus, in Modification Example 4, the bypass passage 125 is provided to the outside of the second pressure reducing valve 218B4. The bypass passage 125 connects the second partial passage 121b on the upstream side of the second pressure reducing valve 218B4 and the third partial passage 121c on the downstream side of the second pressure reducing valve 218B4.

Where Modification Example 4 is employed as well, with the second pressure reducing valve 218B4 in the state of maximum constriction (i.e. in the closed state), the bypass passage 125 (flow passage) can cause fuel gas to pass therethrough.

In this example, a bypass passage 125 is provided, but it may be acceptable to additionally provide a shutoff valve to the bypass passage 125. By so doing, the flow of fuel gas through the bypass passage 125 can be controlled on or off. In this case, the shutoff valve may be set to the open state, only if the output current of the fuel cell stack decreases by a prescribed amount or more.

As shown in FIGS. 8(A)-8(B) and FIGS. 10 through 13, in general, a flow passage(s) should be provided such that, in a state that the second pressure reducing valve is constricted to the maximum extent, fuel gas at the upstream side of the second pressure reducing valve flows to the downstream side of the second pressure reducing valve.

C. Third Embodiment

The fuel cell system of the Third Embodiment is substantially similar to the fuel cell system of the Second Embodiment (FIG. 7), except that the second pressure reducing valve is modified.

Figure 14A:
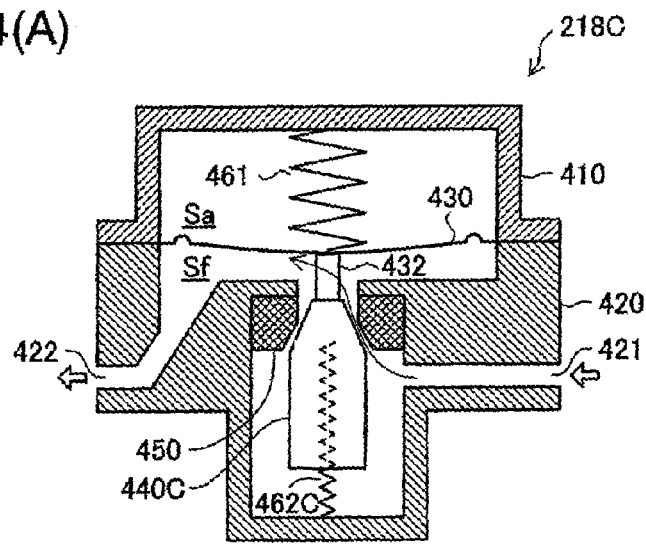
FIGS. 14(A) and 14(B) are illustrations typically showing the internal structure of a second pressure reducing valve 218C in the Third Embodiment.
Figure 14B:
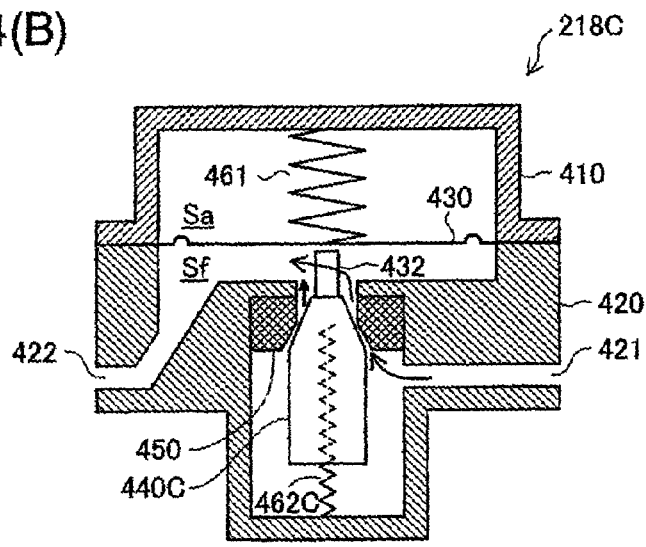

FIGS. 14(A) and 14(B) are illustrations typically showing the internal structure of a second pressure reducing valve 218C in the Third Embodiment. FIG. 14(A) shows the second pressure reducing valve 218C when set to the open state, and FIG. 14(B) shows the second pressure reducing valve 218C when set to the closed state.

The second pressure reducing valve 218C of the present embodiment is substantially similar to the pressure reducing valve 218B shown in FIG. 8, but no groove is provided to the needle valve 440C. Also, as the lower spring 462C of the second pressure reducing valve 218C, a spring having a lower spring constant than in the Comparative Example is employed.

Where this second pressure reducing valve 218C is utilized, in the event of a sharp increase in pressure at the downstream side of the second pressure reducing valve 218C, the needle valve 440 is not able to keep pace with the sudden displacement (rise) of the diaphragm, and rises gradually. Thereby, the second pressure reducing valve 218C closes gradually.

FIGS. 15(a)-15(e) are illustrations showing operation of the fuel gas supply system in the Third Embodiment. FIGS. 15(a)-15(e) correspond respectively to FIGS. 2(a)-2(e). FIGS. 15(a) and 15(c) are the same as FIGS. 2(a) and 2(c). In FIGS. 15(b), 15(d) and 15(e), curves that are the same as FIGS. 2(b), 2(d), and 2(e) are shown by broken lines.

As illustrated, in the present embodiment, the second pressure reducing valve 218C closes more gradually than in the Comparative Example (see FIG. 15(b)). Specifically, after the first pressure reducing valve 214 has been set to the closed state, the second pressure reducing valve 218C is set to the closed state. Thus, in the present embodiment, the pressure Pc in the third partial passage 121c increases more sharply than in the Comparative Example (see FIG. 15(d)). Also, the pressure Pb in the second partial passage 121b rises more gradually than in the Comparative Example (see FIG. 15(e)).

As described above, in the present embodiment, after the first pressure reducing valve 214 has been set to the closed state, the second pressure reducing valve 218C is set to the closed state. Thus, before the second pressure reducing valve 218C is set to the closed state, the fuel gas in the second partial passage 121b flows out to the fuel cell stack 100 on the downstream side, and as a result, excessive rise of the pressure Pb in the second partial passage 121b can be suppressed. Note that the spring constant of the lower spring 462 of the second pressure reducing valve 218C may be determined experimentally in such a way that the second pressure reducing valve 218C is set to the closed state after the first pressure reducing valve 214 has been set to the closed state.

In the present embodiment, the response speed of the second pressure reducing valve 218C is adjusted through modification of the spring constant of the lower spring 462. However, instead of this, the response speed of the second pressure reducing valve may be adjusted through modification of an annular guide member, not shown, for displacing the needle valve along the center axis thereof. Specifically, by interposing an O-ring or the like between the needle valve and the guide member, the frictional force received by the needle valve during displacement may be set to a high level.

The present invention is not limited to the above examples and embodiments set forth hereinabove, and can be reduced to practice in various ways without departing from the spirit thereof, such as the following variations, for example.

In the First Embodiment, excessive rise of the pressure Pb in the second partial passage 121b is suppressed by adjusting the target pressure of the second pressure reducing valve, but in addition to this, the response speed of the second pressure reducing valve may be adjusted in similar manner to the Third Embodiment. In the Second Embodiment, excessive rise of the pressure Pb in the second partial passage 121b is suppressed by providing a flow passage that permits flow of fuel gas with the second pressure reducing valve in the state of maximum constriction, but in addition to this, the response speed of the second pressure reducing valve may be adjusted in similar manner to the Third Embodiment. By so doing, excessive rise of the pressure Pb in the second partial passage 121b can be suppressed further.

INDUSTRIAL APPLICABILITY

The present invention is applicable to fuel gas supply apparatuses for supplying fuel gas to fuel cells.

What is claimed is:

1. A fuel gas supply apparatus for supplying fuel gas to a fuel cell provided on a fuel cell vehicle, comprising:
    a gas passage in which fuel gas to be supplied to the fuel cell flows;
    a first pressure reducing valve provided to the gas passage;
    a second pressure reducing valve provided to the gas passage and disposed at a downstream side of the first pressure reducing valve; and
    a control device that controls operations of the fuel gas supply apparatus,
    wherein the control device, during running of the vehicle, is programmed to set a value of target pressure at a downstream side of the second pressure reducing valve, to a value depending on a consumed amount of fuel gas consumed by the fuel cell, and
    wherein the control device, upon decrease of an amount of power generated by the fuel cell to decrease an amount of fuel gas consumed by the fuel cell by a prescribed amount or more, decreases the value of target pressure of the second pressure reducing valve to a value greater than a corresponding value that is set by the control device and corresponds to the consumed amount of fuel gas consumed by the fuel cell subsequent to the decrease.

2. A fuel gas supply apparatus according to claim 1, further comprising:
    a pressure sensor for sensing pressure between the first pressure reducing valve and the second pressure reducing valve,
    wherein the control device is programmed to further increase the target pressure of the second pressure reducing valve, if after the value of target pressure of the second pressure reducing valve has been modified to the value greater than the corresponding value that is set by the control device and corresponds to the consumed amount of fuel gas consumed by the fuel cell subsequent to the decrease, a value detected by the pressure sensor becomes equal to or greater than a first threshold value.

3. A fuel gas supply apparatus according to claim 1 further comprising:
    a pressure sensor for sensing pressure between the first pressure reducing valve and the second pressure reducing valve,
    wherein the control device is programmed to reduce the target pressure of the second pressure reducing valve, if after the value of target pressure of the second pressure reducing valve has been modified to the value greater than the corresponding value that is set by the control device and corresponds to the consumed amount of fuel gas consumed by the fuel cell subsequent to the decrease, a value detected by the pressure sensor becomes equal to or less than a second threshold value.

4. A fuel gas supply apparatus according to claim 1, wherein the modified value modified by the control device to the value greater than the corresponding value that is set by the control device and corresponds to the consumed amount of fuel gas consumed by the fuel cell subsequent to the decrease is set, such that fuel gas in a significant amount flows into the fuel cell, wherein the significant amount is equal to or less than a leakage amount of fuel gas permeating from an anode side to a cathode side via an electrolyte membrane of the fuel cell.

5. A fuel gas supply apparatus according to claim 1, further comprising:
    an ammeter for sensing output current of the fuel cell, the output current relating to the amount of fuel gas consumed by the fuel cell.

6. A fuel gas supply apparatus according to claim 1, wherein the value of target pressure at the downstream side of the first pressure reducing valve is set to a fixed value.

7. A fuel gas supply apparatus according to claim 1, wherein the second pressure reducing valve is a variable pressure regulating valve that is capable of adjusting the target pressure of the second pressure reducing valve.

8. A fuel gas supply apparatus for supplying fuel gas to a fuel cell provided on a fuel cell vehicle, comprising:
    a gas passage in which fuel gas to be supplied to the fuel cell flows;
    a first pressure reducing valve provided to the gas passage;
    a second pressure reducing valve provided to the gas passage and disposed at a downstream side of the first pressure reducing valve; and
    a control module,
    wherein the control module, during running of the vehicle, is programmed to set the second pressure reducing valve to a closed state after the first pressure reducing valve has been set to a closed state, upon decrease of an amount of power generated by the fuel cell to decrease a consumed amount of fuel gas consumed by the fuel cell, and
    wherein the control device, upon decrease of an amount of power generated by the fuel cell to decrease an amount of fuel gas consumed by the fuel cell by a prescribed amount or more, decreases the value of target pressure of the second pressure reducing valve to a value greater than a corresponding value that is set by the control device and corresponds to the consumed amount of fuel gas consumed by the fuel cell subsequent to the decrease.

9. A fuel gas supply apparatus according to claim 8, wherein
    a value of target pressure at the downstream side of the first pressure reducing valve is set to a fixed value, and
    a value of target pressure at a downstream side of the second pressure reducing valve is set to a fixed value.

* * * * *